United States Patent [19]
Iida

[11] Patent Number: 5,414,682
[45] Date of Patent: May 9, 1995

[54] FOCUS DRAW-IN SYSTEM FOR OPTICAL DISC DEVICE

[75] Inventor: Makoto Iida, Takatsuki, Japan

[73] Assignee: Matsushita Electric Industrial Co., Ltd., Osaka, Japan

[21] Appl. No.: 137,211

[22] Filed: Oct. 18, 1993

Related U.S. Application Data

[63] Continuation of Ser. No. 935,045, Sep. 3, 1992, abandoned, which is a continuation of Ser. No. 592,545, Oct. 2, 1990, abandoned.

[30] Foreign Application Priority Data

Oct. 4, 1989 [JP]  Japan .................................. 1-259018

[51] Int. Cl.⁶ .............................................. G11B 7/00
[52] U.S. Cl. ................................ 369/44.25; 369/44.29
[58] Field of Search ............... 369/44.11, 44.29, 50, 369/44.25, 44.32, 44.34; 250/201.5

[56] References Cited

U.S. PATENT DOCUMENTS

| 4,446,546 | 5/1984 | Miller | 369/44.29 |
|---|---|---|---|
| 4,512,003 | 4/1985 | Kimura et al. | 369/44.29 |
| 4,542,491 | 9/1985 | Takasago et al. | 369/44.29 |
| 4,561,080 | 12/1985 | Yamazaki | 369/44.25 |
| 4,740,679 | 4/1988 | Doi | 369/44.29 |
| 4,786,794 | 11/1988 | Doi | 369/44.25 |
| 4,998,233 | 3/1991 | DiMatteo et al. | 369/44.25 |
| 5,020,045 | 5/1991 | Smart et al. | 369/44.29 |
| 5,142,517 | 8/1992 | Takahashi | 369/44.25 |
| 5,187,696 | 2/1993 | Ishii et al. | 369/44.29 |

FOREIGN PATENT DOCUMENTS

| 0088441 | 3/1983 | European Pat. Off. . |
|---|---|---|
| 63-13261 | 3/1988 | Japan . |
| 63-34528 | 7/1988 | Japan . |

Primary Examiner—Georgia Y. Epps
Assistant Examiner—Nabil Hindi
Attorney, Agent, or Firm—Wenderoth, Lind & Ponack

[57] ABSTRACT

A focus draw-in method for an optical disc device, includes the steps of detecting a peak of a focus error signal, and after detecting the peak, applying a driving force to an optical device in a direction of the detected peak until the relative speed between a disc face and the optical device becomes small, and effecting focus control at a time point when the relative speed between the disc face and the optical device has become small. By the method noted above, the focus draw-in function with a high performance capable of effecting an efficient draw-in even when the relative speed between the disc face and the optical device is large, may be advantageously realized.

17 Claims, 8 Drawing Sheets

FOCUS DRAW-IN SYSTEM FOR OPTICAL DISC DEVICE

This application is a continuation of now abandoned application, Ser. No. 07/935,045, filed Sep. 3, 1992 which is in turn a continuation of now abandoned application Ser. No. 07/592,545, filed Oct. 2, 1990 now abandoned.

BACKGROUND OF THE INVENTION

The present invention generally relates to an optical disc device, and more particularly, to a focus draw-in method for an optical disc device.

It has been a recent trend that a large member of products related to optical discs such as compact disc players and the like, have been introduced into the market. Commonly, data of an optical disc are arranged in a spiral shape from an inner periphery to an outer periphery of the optical disc in the form of pits, and the data are settled thereon by the presence or absence of such pits. The role of an optical servo is to direct a focal point of light emitted form the optical device onto a predetermined row of pits during reproduction of data on the optical disc, thereby to establishing a state where the data is readily read out. The optical servo includes a focus control which functions to bring the optical device into focus on the disc face, and a tracking control for focusing onto the pit row on the disc face. For the control procedure, it is so arranged that, after rotating the disc by a motor, the optical device is driven in a direction perpendicular to the disc surface to effect the focus draw-in function.

For the explanation of the focus draw-in function, the formation of a focus error signal will be described hereinafter.

As shown in FIG. 8, the focus error signal becomes zero when the focal point is located on a disc face, while an absolute value of the focus error signal is increased as the focal point is spaced from the disc face in the perpendicular direction, and is reduced after reaching a peak value. In the focus control, it is so arranged that, when the focus error signal is present within an S-shaped peaks (i.e. within a range between peaks for an S-shaped curve: referred to as S-shaped peaks hereinafter), the absolute value of the focus error signal is reduced to zero for control so as to focus on the disc face, and the "focus draw-in" refers to the function at a stage prior to execution of the focus control.

Conventional focus draw-in systems are explained below.

Japanese Patent Publication Tokkosho No. 63-13261, issued on Mar. 24, 1988 to Minoru KOZAKE and Tetsuo SHIMIZU, and entitled "Focus servo device", and Japanese Patent Publication Tokkosho no. 63-34528 issued on Jul. 11, 1988 to T. OKANO, and entitled "Focus lens servo draw-in device in optical information reading device" discloses two prior art focus draw-in systems.

In the focus servo device according to the above noted first prior art reference a reference voltage is produced with the same polarity as a focus error signal to be produced when the optical device is spaced from the disc beyond a "just focus" point, and the voltage has an absolute value smaller than that of the polarity value of said focus error signal, whereby when the focus error signal crosses the reference voltage at the side of the "just focus" point beyond the polarity value, the processing is transferred into the focus control.

Meanwhile, in the focus lens servo draw-in device according to the above noted second prior art, reference a reference voltage is produced with the same polarity as a focus error signal to be produced when the optical device approaches the disc beyond a "just focus" point, and the voltage has an absolute value smaller than that of the polarity value of said focus error signal, whereby when the focus error signal crosses the reference voltage at the side of the "just focus" point beyond the polarity value, a counter force gradually attenuated from a predetermined level is applied to the optical device, and when it crosses the reference voltage again, the processing is transferred into the focus control.

However, in the first prior art arrangement as described above, when the relative speed between the disc face and the optical device is large, it is impossible to stabilize within the S-shaped region of the focus error signal even upon transfer into the focus control, thus resulting in undesirable deviation from the S-shaped region.

Meanwhile, in the second prior art arrangement as referred to above, when the relative speed between the disc face and the optical device is large, it is also impossible to stabilize within the S-shaped region of the focus error signal, even if a counter force is applied, similarly resulting in deviation from the S-shaped region.

SUMMARY OF THE INVENTION

Accordingly, an essential object of the present invention is to provide a focus draw-in method for an optical disc device which presents a high focus draw-in performance.

Another object of the present invention is to provide a focus draw-in method as described above which may be readily applied to optical disc devices through simple construction.

In accomplishing these and other objects, according to one preferred embodiment of the present invention, there is provided a focus draw-in method for an optical disc device, which includes the steps of detecting a peak of a focus error signal, and after detecting the peak, applying a driving force to an optical device in a direction of said detected peak until the relative speed between a disk face and the optical device becomes small, and effecting focus control at a time point when the relative speed therebetween has become small.

By the steps of the present invention as described above, even in the case where the relative speed between the disc face and the optical device is high, and stabilization within the S-shaped region of the focus error signal can not be achieved upon closing of the servo-loop, a strong braking force may be continuously exerted from the peak of the focus error by applying a driving force to the optical device in the direction of the peak as detected after the peak detection, and the focus is drawn-in at the time point when the relative speed between the disc face and the optical device has become small or low, and therefore, focus draw-in at a high capacity may be realized even when the relative speed between the disc face and the optical device is large.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
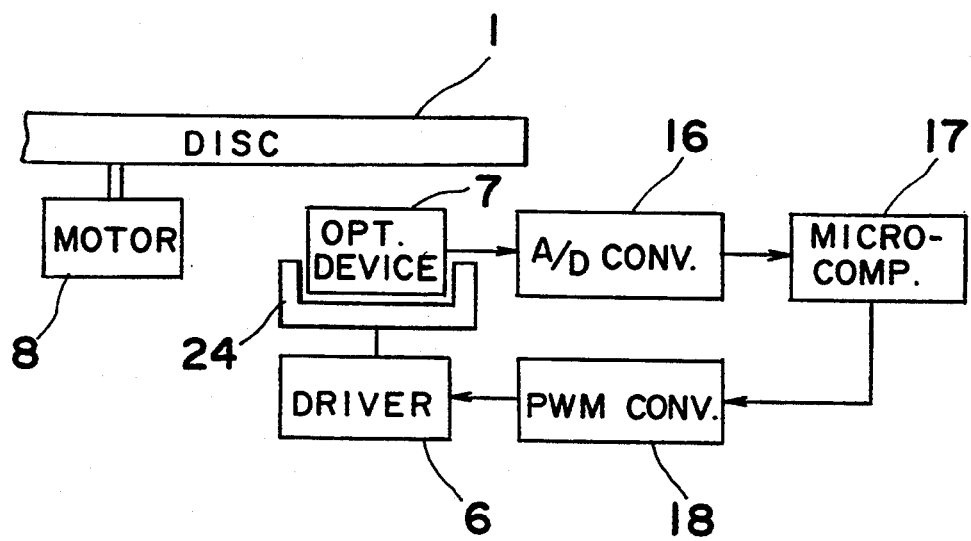
FIG. 1 is a schematic block diagram showing a general construction of a focus draw-in circuit to which a focus draw-in method of the present invention may be applied.

Before the description of the present invention proceeds, it is to be noted that like parts are designated by like reference numerals throughout the accompanying drawings.

Referring now to the drawings, a focus draw-in method according to the present invention will be explained in detail hereinafter.

FIGS. 1 to 4(B) relate to a first embodiment according to the present invention, and represent the case where a focus error signal is sampled by an A/D converter, and a control by a microcomputer is effected based on the sampled error signal.

FIG. 1 is a block diagram showing a general construction of the focus draw-in circuit according to the present invention, which includes a motor 8 for rotating a disc 1 as an information recording medium, an A/D converter 16 inserted between an optical device 7 and a microcomputer 17 and adapted to convert a focus error signal in the analog form received as an input, into digital data of 8 bits for input to the micro-computer 17, which effects calculation, judgement, etc. based on the 8 bit data so as to apply PWM (Pulse Width Modulation) data to a PWM converter 18 coupled therewith. The PWM converter 18 connected to a driver 6 receives the PWM data which is the output of the microcomputer 17 and outputs a pulse width modulation signal to said driver 6. The driver 6 outputs an electrical current proportional to the input voltage value to an actuator 24 connected thereto. This actuator 24 having the output current of the driver 6 as the input drives the optical device 7 by said input current in a direction perpendicular to the disc face. The optical device 7 arranged to be thus driven by the actuator 24, also produces the focus error signal.

Figure 2:
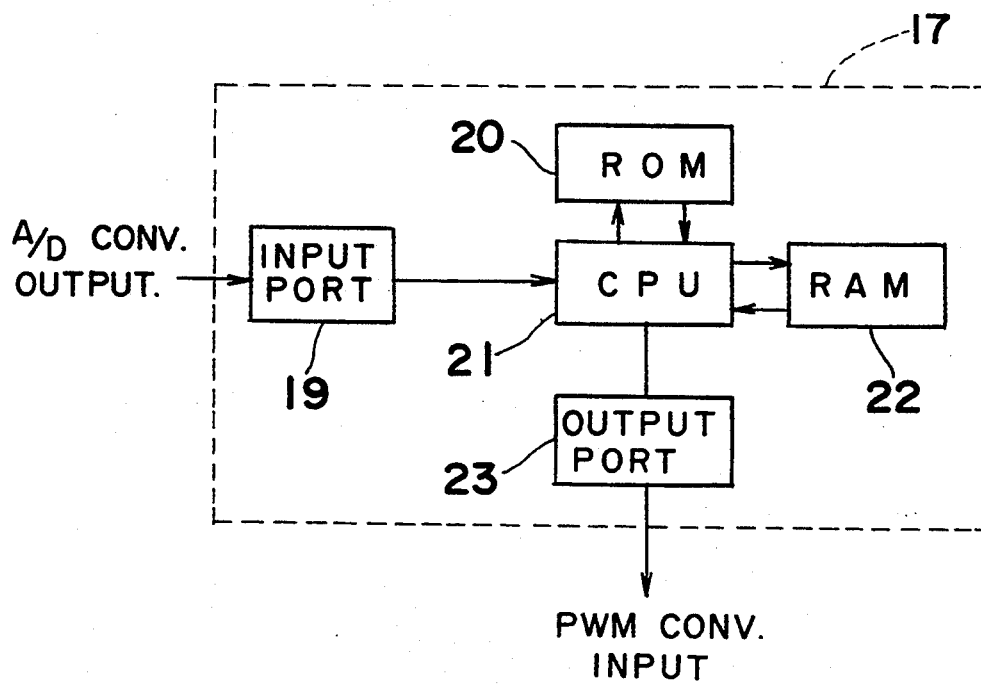
FIG. 2 is also a block diagram showing an internal construction of a micro-computer employed in the focus draw-in circuit related to the present invention.

FIG. 2 shows an internal construction of the microcomputer 17 referred to above, which includes an input port 19 which receives an output of the A/D converter 16, and outputs to a CPU (central processing unit) 21.

The CPU 21 outputs an address to a ROM (Read Only Memory) 20 which is a memory containing a program for the microcomputer 17, and receives the program for the address from the ROM 20, and based on the program thus inputted, functions to read data of the input port 19, to read or write data with respect to a RAM (Random Access Memory) 22, to effect calculation or judgement, or to output data to an output port 23 connected to the CPU 21.

Figure 3:
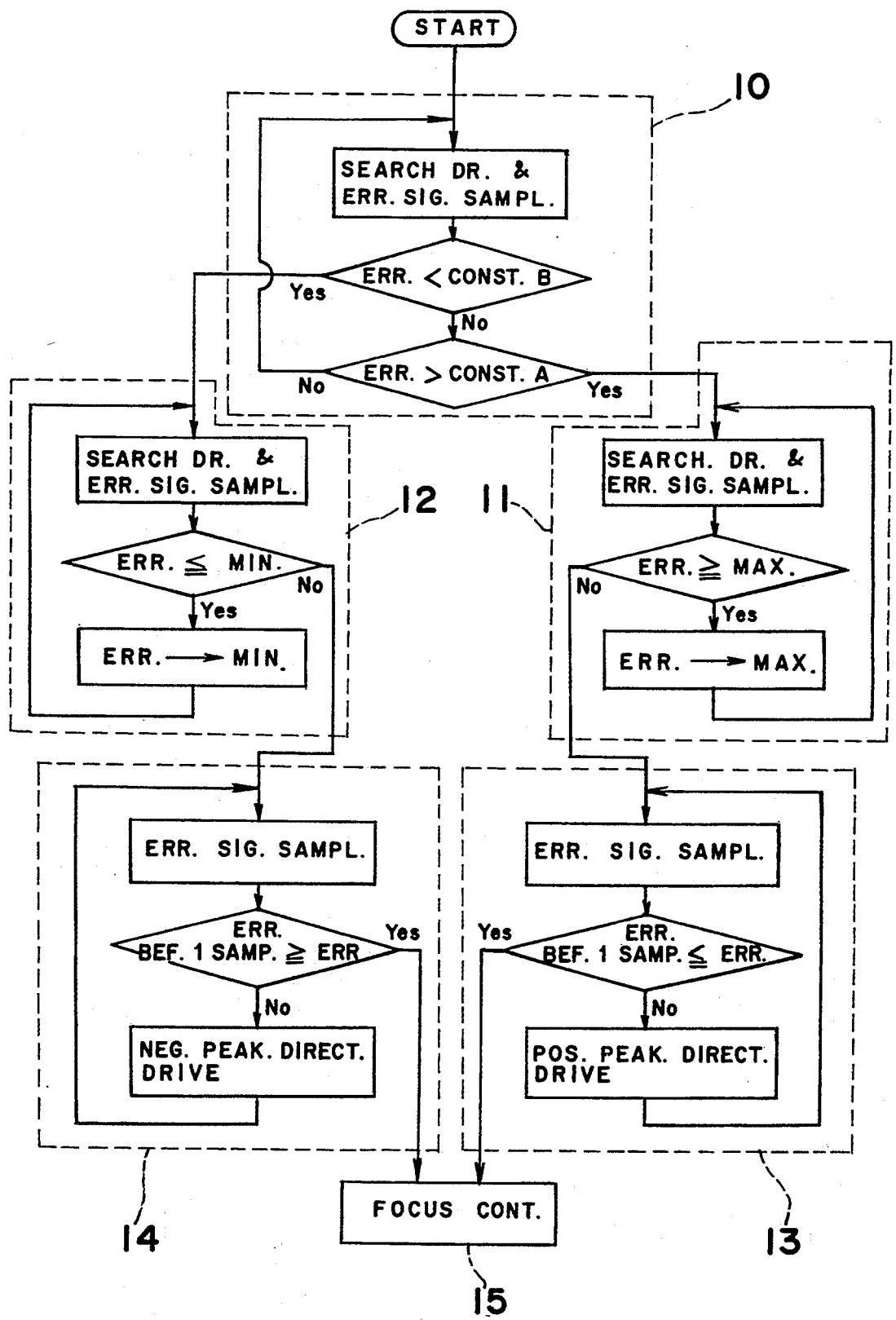
FIG. 3 is a flow-chart for a focus draw-in method according to a first embodiment of the present invention.
Figure 4:
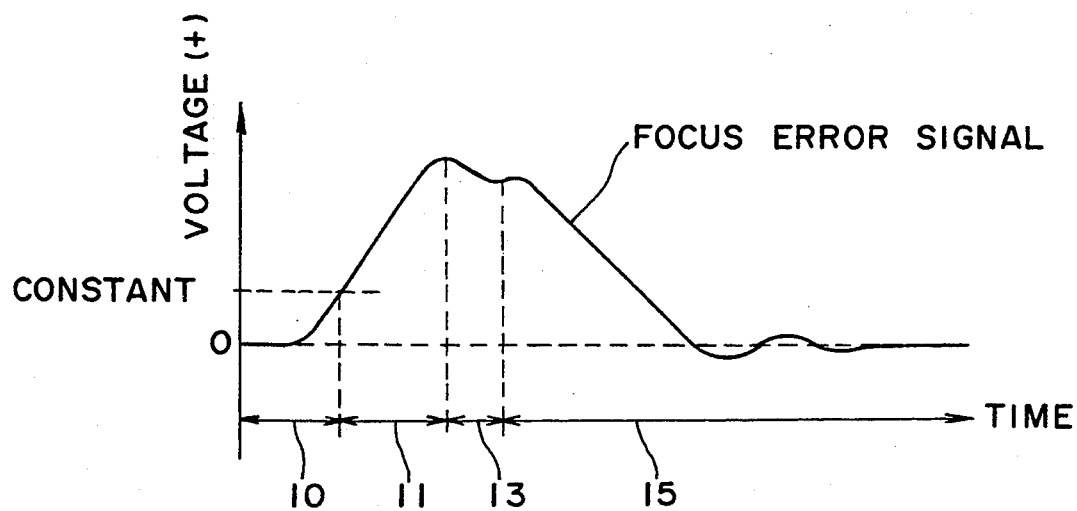
FIGS. 4(A) and 4(B) are graphical diagrams for explaining a general concept of the focus draw-in method of the present invention.
Figure 4:
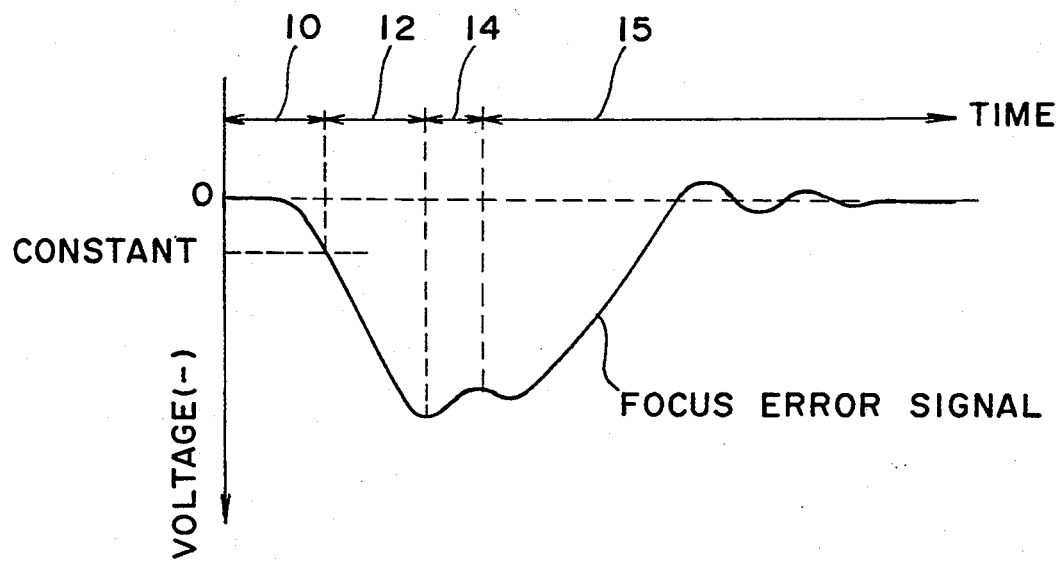

Referring also to FIG. 3 showing a flowchart for the focus draw-in method according to the first embodiment of the present invention, an S-shaped region intruding direction detecting step 10 detects from which of positive or negative direction the focus error signal begins to appear, and in the case where it intrudes into the S-shaped region in a positive direction, the step is shifted to a positive peak detecting step 11, while it is transferred to a negative peak detecting step 12 upon intrusion thereof into the S-shaped region from a negative direction. The positive peak detecting step 11 detects a positive peak of the error signal, and after detection of the positive peak, the step is shifted to a positive direction braking step 13. This positive direction braking step 13 continues to drive the optical device 7 in the positive peak direction until an inclination of the error signal becomes zero or positive after completion of the positive peak detecting step 11, and when the inclination of the error signal becomes zero or positive, the step is transferred into a focus control step 15. The negative peak detecting step 12 detects the negative peak of the error signal, and after detection of the negative peak, the step is transferred to a negative direction braking step 14. This negative direction braking step 14 continues to drive the optical device 7 in the negative peak direction until an inclination of the error signal becomes zero or negative after completion of the negative peak detecting step 12, and when the inclination of the error signal becomes zero or negative, the step is transferred into the focus control step 15. This focus control step 15 effects a focus control adapted to reduce an absolute value of the focus error signal to zero after completion of braking.

FIGS. 4(A) and 4(B) show waveform diagrams representing the focus draw-in functions, and FIG. 4(A) relates to the case where the focus error signal intrudes into the S-shaped region in a positive direction, while FIG. 4(B) shows the case where the intrusion of the focus error signal is effected in a negative direction. It is to be noted here that numerals in FIGS. 4(A) and 4(B) correspond to the numerals representing the respective steps in the flow-chart of FIG. 3.

Still referring to FIGS. 1 to 4(B) as described so far, functioning according to the first embodiment of the present invention will be described hereinafter.

It is to be noted here that in the embodiment to be described, the focus error signal is sampled by the A/D converter 16, and the sampled data is of 8 bits, with a sampling frequency set at 44.1 KHz.

In the S-shaped region intrusion detecting step 10 in FIG. 3, the error signal is sampled after search driving to determine whether or not the focus error signal exceeds a threshold value. For the search driving, driving data is applied from the micro-computer 17 to the PWM converter 18 so as to move the optical device 7. The search driving is effected by triangular waves, and the appearance of the S-shaped curve for the focus error signal is monitored. When the threshold signal exceeds the threshold value, it is regarded as intrusion into the focus error signal S-shaped region, and the step is shifted to a subsequent positive/negative peak detecting step. In the microcomputer 17 in FIG. 2, the data of the focus error signal is applied to the CPU 21 from the input port 19, while the threshold value data in the program of the ROM 20 is also inputted to the CPU 21, whereby the two data are compared, and based on the result of said comparison, the address of the ROM 20 is selected. The negative threshold value is represented by a constant B, while the positive threshold value is denoted by a constant A. The reason for setting the positive and negative threshold values in the above arrangement is such that there are two ways in which the S-shaped curve for the focus error signal appears, since the polarity of the focus error signal during the peak time differs depending on directions in which the focus of the optical device 7 approaches the surface of the disc 1 as will be seen from FIG. 8. It is to be noted here that for the constants A and B, Figures equal to each other in the absolute value are to be employed.

Subsequently, with respect to the peak detection, there will be considered a case where a positive threshold value has been exceeded.

In the flow-chart of FIG. 3, when the focus error signal exceeds the constant A which is the positive constant, the flow is transferred to that of the positive peak detecting step 11. In the positive peak detecting step 11, the focus error signal is sampled by the A/D converter 16 after the search driving, and is applied to the CPU 21 through the input port 19, whereby comparison between the sampled error signal and the size of the maximum value is effected. The initial value of the maximum value is set to zero and is stored in the RAM 22. During execution of the positive peak detecting step 11, since the focus error signal is simply increasing until the positive peak is exceeded, the maximum value is continuously renewed and stored in the RAM unless an error signal which is smaller than the maximum value is received. This positive peak detecting step 11 is represented by the numeral 11 in FIG. 4(A), which detects the maximum value. Upon passing the peak for the focus error signal, the error signal becomes smaller than the maximum value, and enters the flow for the next positive direction braking step 13 through the positive peak detecting step 11.

The positive direction braking step 13 functions in the manner as described hereinafter.

Firstly, the focus error signal is sampled to be applied to the CPU 21, and is also stored in the RAM 22. Subsequently, data of the focus error signal before one sample and that of the present sample are compared with each other for size. At the time point when the function is transferred into the positive braking function, since the error signal is reduced after passing the S-shaped peak, the error of the present sample has become smaller than that before one sample, and thus, the flow is shifted into the subsequent positive peak direction driving. In the positive peak direction driving, the optical device 7 is driven to the maximum extent in the direction in which the error signal is increased within the focus error S-shape peaks, i.e. in the positive peak direction, whereby the speed in the direction for decreasing the error signal is reduced. While the error signal is decreasing, the braking function is continued, and the maximum driving force is continuously applied in the direction to stop the relative motion between the surface of the disc 1 and the optical device 7. Subsequently, when the focus error of the present sample becomes equal to or larger than that before one sample, it is judged that the relative speed between the surface of the disc 1 and the optical device 7 is in the vicinity of zero, and the focus draw-in is completed through the positive direction braking step 13, and the flow is shifted into the ordinary focus control step 15. Although the ordinary focus control step 15 intends to reduce the absolute value of the focus error signal to zero, since the focus control is started when the absolute value of the focus error signal is changed from the reduction to increase in this case, the relative speed between the surface of the disc 1 and the optical device 7 is in the vicinity of zero, and thus, the draw-in may be readily effected.

Hereinafter, the draw-in function when the focus error signal exceeds the negative threshold value will be explained.

In the S-shaped region intruding direction detecting step 10 of FIG. 3, when the sampled focus error signal falls below the constant B which is the negative constant, the flow is shifted to the negative peak detecting step 12. At the negative peak detecting step 12, the focus error signal is sampled after the search driving, and the sampled error signal and the minimum value are compared for size. If the initial value of the minimum value is set to zero, the minimum value is continuously renewed unless an error signal which is larger than the minimum value is received, since the error signal is negative in this case. The above negative peak detecting step 12 is represented by the numeral 12 in FIG. 4(B), which detects the minimum value. When the negative peak of the focus error signal is exceeded, the error signal becomes larger than the minimum value, and the flow enters the next negative direction braking step 14 through the negative peak detecting step 12.

Subsequently, the function of the negative direction braking step 14 will be explained hereinbelow.

In the first place, the focus error signal is sampled to be stored in the RAM 22; then, data of the focus error signal before one sample and that of the present sample are compared with each other for size. At the time point when the function is transferred into the negative braking function, since the error signal is increased over the S-shaped peak, the error of the present sample has become larger than that before one sample, and thus, the flow is shifted into the subsequent negative peak direction driving. In the negative peak direction driving, the optical device 7 is driven to the maximum extent in the direction in which the error signal is decreased within the focus error S-shaped peaks, i.e. in the negative peak direction, whereby the speed in the direction for increasing the error signal is reduced. While the error signal is increasing, the braking function is continued, and the maximum driving force is continuously applied in the direction to stop the relative motion between the surface of the disc 1 and the optical device 7. Subsequently, when the focus error of the present sample becomes equal to or smaller than that before one sample, it is judged that the relative speed between the surface of the disc 1 and the optical device 7 is in the vicinity of zero, and the focus draw-in is completed through the negative direction braking step 14, and the flow is shifted into the ordinary focus control step 15. Although the ordinary focus control step 15 intends to reduce the absolute value of the focus error signal to zero, since the focus control is started when the absolute value of the focus error signal is changed from the increase to reduction in this case, the relative speed between the surface of the disc 1 and the optical device 7 is in the vicinity of zero, and thus, the draw-in may be readily effected.

As is seen from the foregoing description, according to the first embodiment of the present invention, the focus draw-in method for the optical disc device is constituted by the steps of detecting the peak of the focus error signal, and after detecting the peak, applying the maximum driving force to the optical device in the direction of the detected peak until the relative speed between the disk face and the optical device becomes small, and effecting the focus control at the time point when said relative speed therebetween has become small, whereby the draw-in may be easily effected even in the case where the relative speed between the disk and the optical device is large.

Figure 5A:
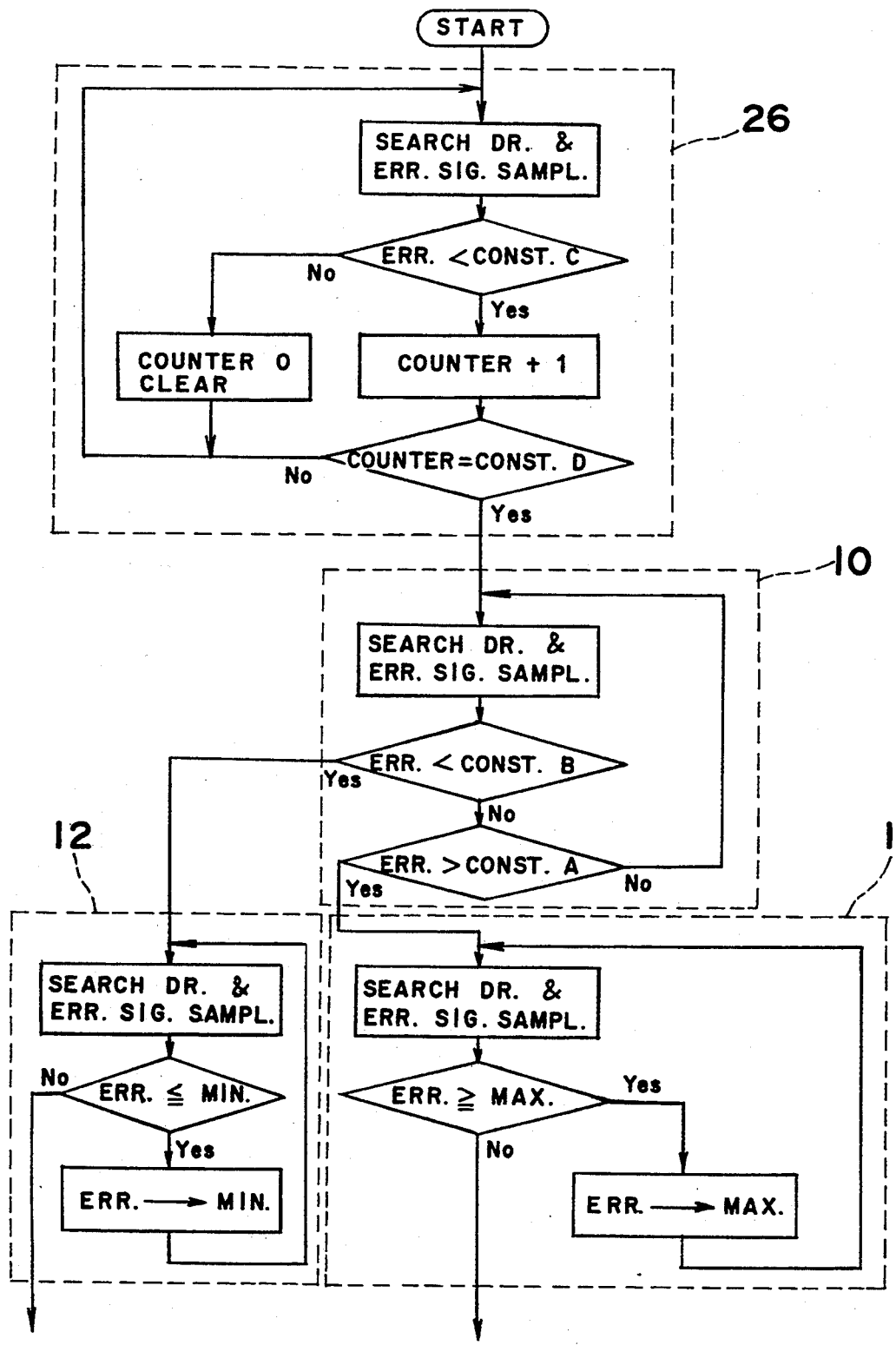
FIGS. 5(A) and 5(B) are flow-charts for the focus draw-in method according to a second embodiment of the present invention.
Figure 5B:
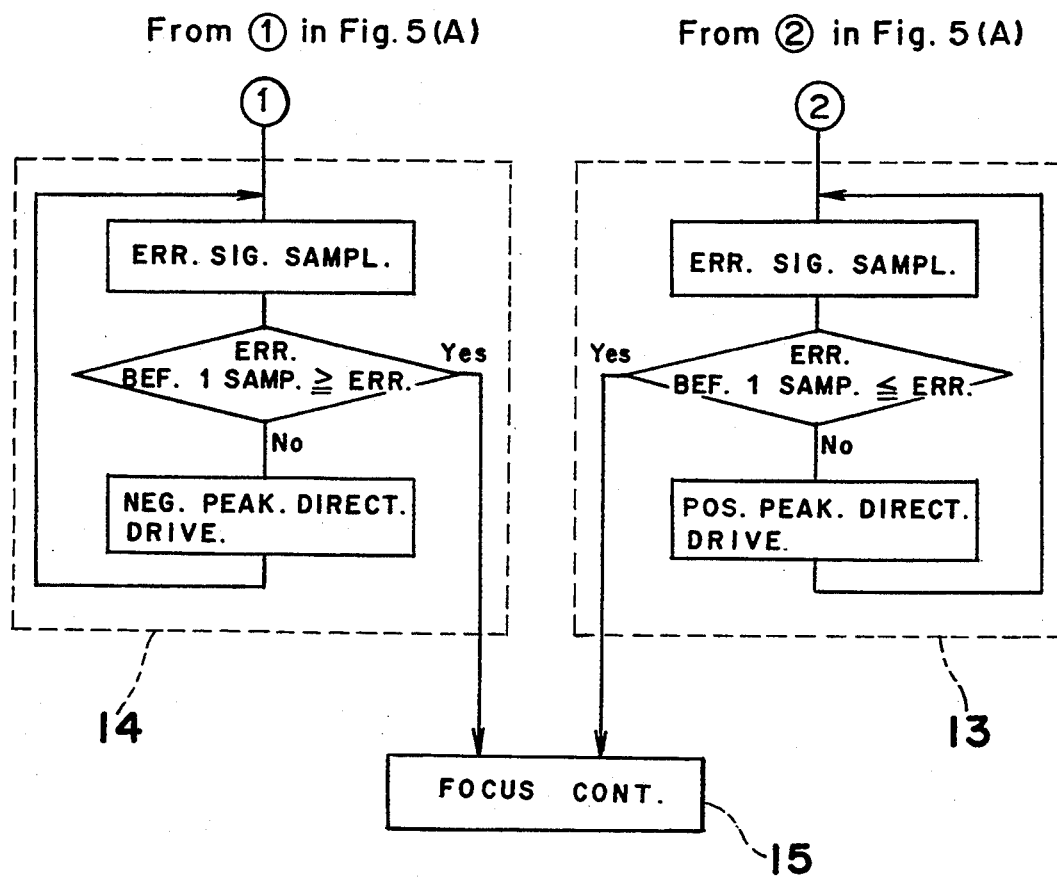

Referring to FIG. 5(A)–5(B), there is shown a flow-chart for the focus draw-in method according to a second embodiment of the present invention.

It should be noted here that the construction of the focus draw-in circuit for FIG. 5 is generally the same as that of the first embodiment of FIG. 3, and the essential difference thereof from the circuit of FIG. 3 is such that an out-of S-shaped region detecting circuit 26 is added before the S-shaped region intruding direction detecting step 10, immediately after starting of the focus draw-in.

The function of the focus draw-in method according to the second embodiment of the present invention arranged as described above will be explained hereinafter.

With respect to the out-of S-shaped region detecting step 26, the error signal is first sampled after the search driving. Since the search driving is effected in the similar manner as in the first embodiment, a detailed description thereof is abbreviated here for brevity. Then, it is judged whether or not the absolute value of the sampled error signal is smaller than the constant C. If it is smaller, 1 is added to a counter, while, if not, the counter is cleared to 0. The counter is constituted by the micro-computer 17, and the value added by the CPU 21 is stored in the RAM 22, and the counting function is effected by applying the data of the RAM 22 again to the CPU 21 for effecting addition. At the starting, the counter has been cleared to 0. The sampled data is of 8 bits, with the sampling frequency of 44.1 KHz. When the value of the counter reached a constant D, it is regarded to be in the out of the focus error S-shaped region, and the flow enters the subsequent S-shaped region intruding direction detecting step 10.

Figure 8:
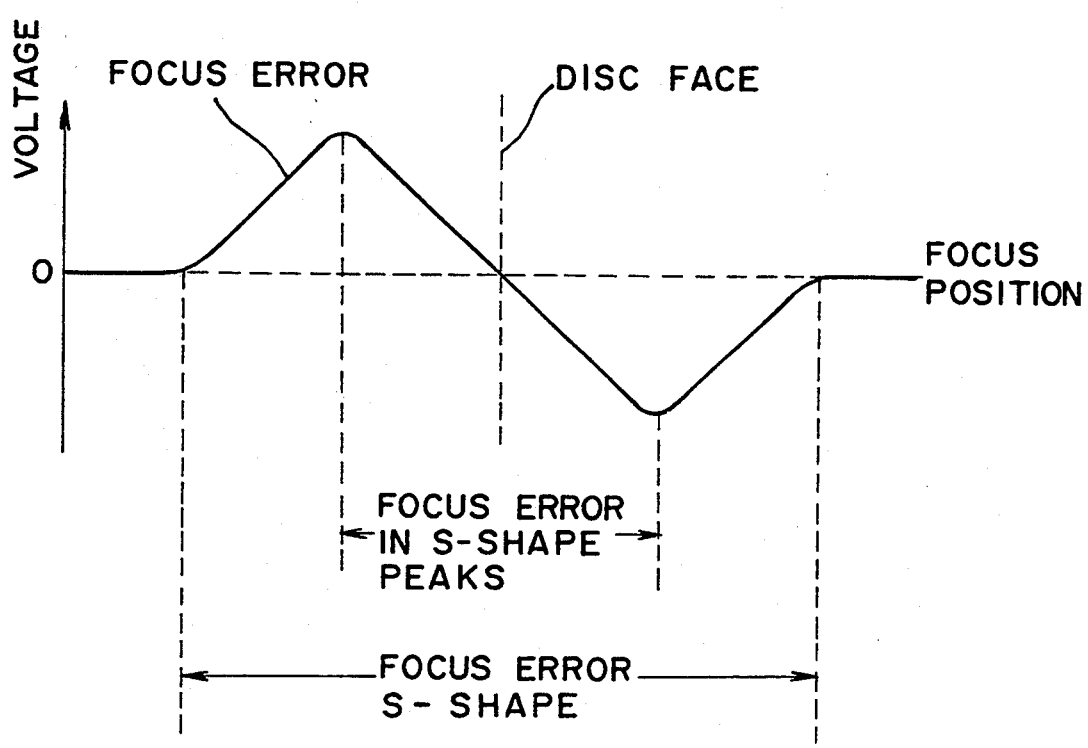
FIG. 8 is a graphical diagram showing the relationship between the focus position of the optical device and focus error signal.

It is to be noted here that the out-of focus error S-shaped region is represented by the portion out of the range for the focus error S-shaped region in FIG. 8.

When the focus draw-in is to be effected, there is no guarantee that the initial state is out of the S-shaped region, and thus, erroneous function for the draw-in is prevented by moving into a series of focus draw-in functions after confirmation that the state is out of the S-shaped region. For example, upon supposition that the focus draw-in happens to be started when the focal point of the optical device 7 is located in the vicinity of the face of the disc 1 (i.e. in the "just focus" state), the focus error signal is increased in the absolute value so as to be spaced from the just focus point. Thus, the absolute value of the focus error signal is reduced by passing over the peak, but in this case, it is judged to have entered the focus error S-shaped peaks, irrespective of its deviation therefrom, and the optical device is driven towards the outside of the focus error S-shaped region, and thus, the absolute value of the focus error signal is only subjected to the simple decrease so as to be out of the focus error S-shaped region. In the second embodiment as described so far, the erroneous function in the case where the focus draw-in is started from inside of such S-shaped region is advantageously prevented.

Since the construction and function of the focus draw-in method according to the second embodiment of the present invention after the out-of S-shaped region detecting step 26 are the same as those of the first embodiment of FIG. 3, a detailed description thereof is abbreviated here for brevity, with like steps being designated by like reference numerals.

Figure 6:
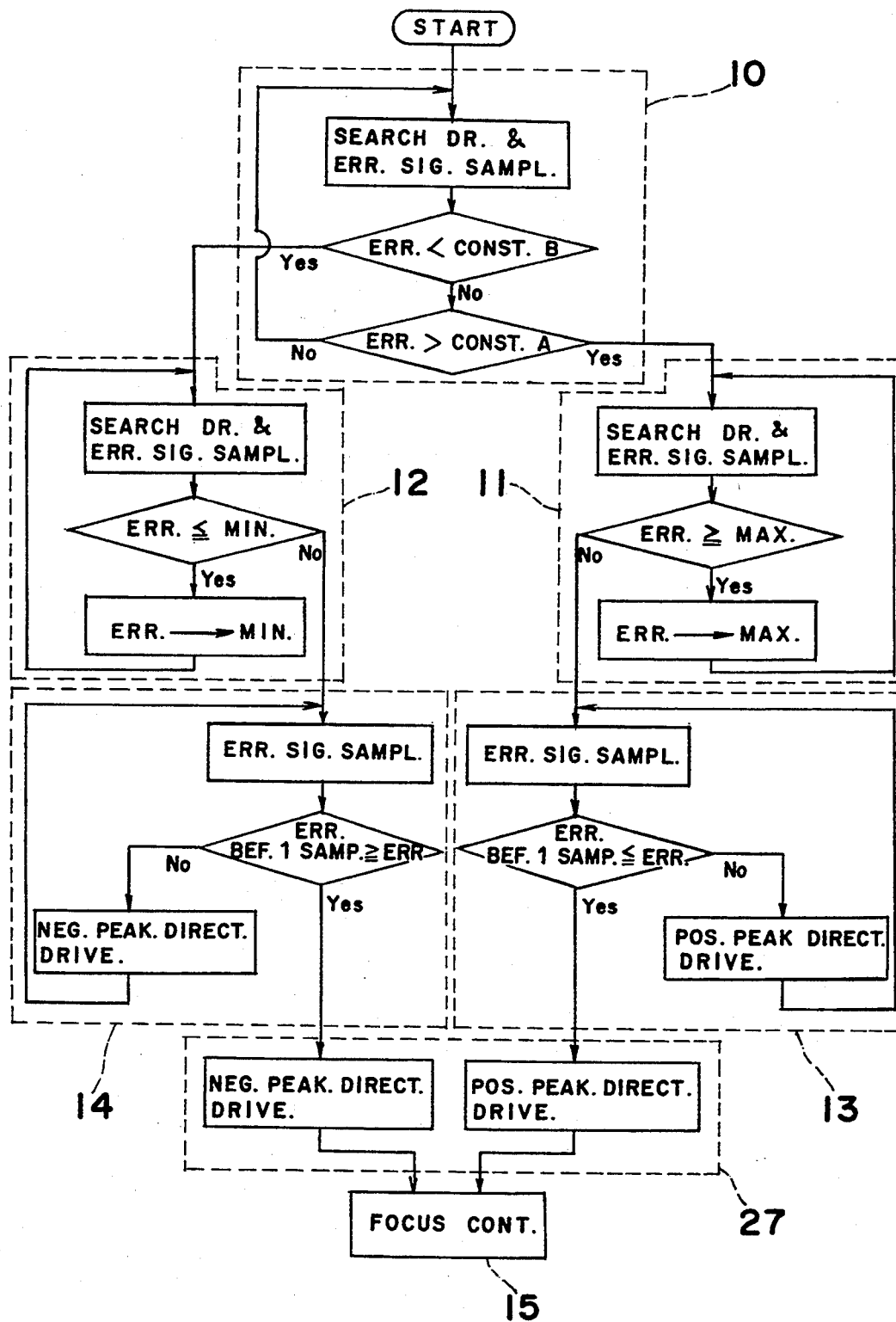
FIG. 6 is a flow-chart for the focus draw-in method according to a third embodiment of the present invention.

As described so far, according to the second embodiment of present invention, through addition of the out-of S-shaped region detecting step 26 to the steps of the first embodiment, the malfunctions in the draw-in when the focus draw-in function is started from inside the focus error S-shaped region, can be advantageously eliminated. 10 Referring to FIG. 6, there is shown a flow-chart for the focus draw-in method according to a third embodiment of the present invention.

It should be noted here that the construction of the focus draw-in circuit for in FIG. 6 is generally the same as that of the first embodiment of FIG. 3, and the essential difference thereof from the circuit of FIG. 3 resides in that there is added a counter direction driving step 27 which drives in a direction opposite to that of the braking during transfer to the focus control step 15 after completion of the positive or negative direction braking function.

Since the construction and function of the focus draw-in method according to the third embodiment of the present invention before the counter direction driving step 27 are the same as those of the first embodiment of FIG. 3, a detailed description thereof is abbreviated here for brevity, with like steps being designated by like reference numerals.

In the above arrangement of FIG. 6, the reason for driving in the counter direction is such that, when there are many cases where the polarity of inclination of the error signal varies or becomes zero before the focus error signal is subjected to zero-crossing, with a strong braking force being applied in a constant direction by the braking function, the draw-in function may be effected more smoothly when there is given a slight speed in the direction in which the focus error signal becomes zero, than when there is a tendency to overshoot.

As described above, in the third embodiment of FIG. 6, the stability for the focus draw-in may be improved through addition of the counter direction driving step 27 to the first embodiment of FIG. 3.

Figure 7:
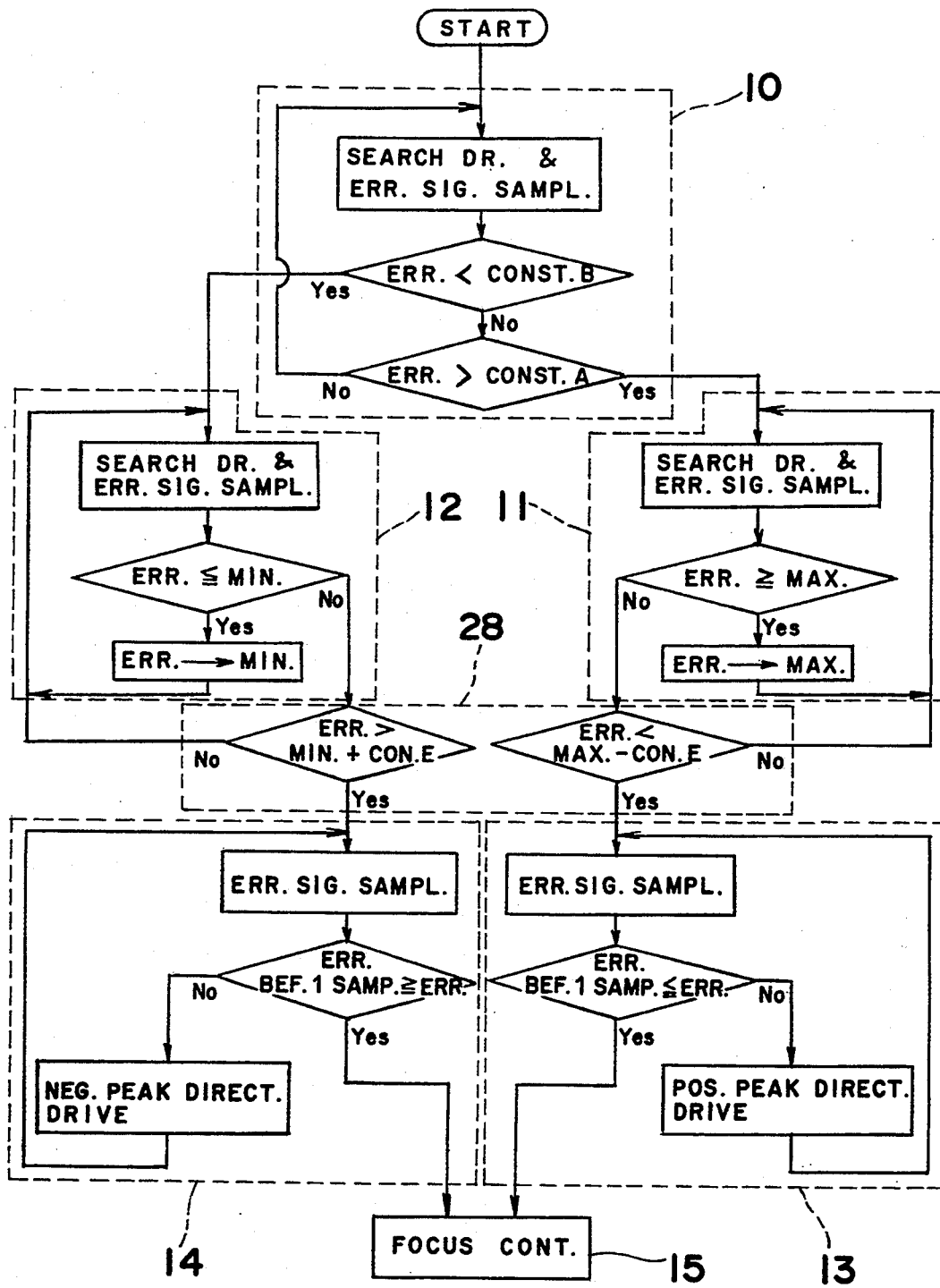
FIG. 7 is also a flow-chart for the focus draw-in method according to a fourth embodiment of the present invention.

Referring further to FIG. 7, there is shown a flow-chart for the focus draw-in method according to a fourth embodiment of the present invention.

It should be noted here that the construction of the focus draw-in circuit for FIG. 7 is generally the same as that of the first embodiment of FIG. 3, and the essential difference thereof from the circuit of FIG. 3 resides in that a noise discriminating step 28 is inserted between the positive and negative peak detecting steps 11 and 12 and the positive and negative direction braking steps 13 and 14 so that the braking function may not be erroneously started by the noise of the focus error signal. As the conditions for moving into the braking through the peak detection, it is so arranged to shift into the subsequent braking when the value becomes smaller than that obtained by subtracting a positive constant E from the absolute value of the error signal by taking into account, the case in which noise is contained in the focus error signal. By the above arrangement, the peak detection accurately detects exceeding of the peak even when noise is present in the error signal. The constant E is set to be smaller than the absolute value of the peak value so as to cover the noise component.

Since the construction and function of the focus draw-in method according to the fourth embodiment of the present invention after the noise discriminating step 28 are the same as those of the first embodiment of FIG. 3, a detailed description thereof is abbreviated for brevity, with like steps being designated by like reference numerals.

As described so far, according to the fourth embodiment of present invention, through addition of the noise discriminating step 28 to the steps of the first embodiment, it becomes possible to prevent erroneous shifting to the braking function by the error of the focus error signal.

It should be noted here that in the foregoing embodiments, although the focus error signal is subjected to the sampling for the control by the micro-computer, the arrangement may be replaced by an analog circuit depending on necessity.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A focus draw-in method for use in an optical disc device which includes an optical disk of an information recording medium, a laser for projecting light on the optical disk, an optical device for generating a focus error signal using light reflected from the disk and adapted to be moved by an actuator in a direction vertical to the optical disk plane, and a control device for receiving the focus error signal and for outputting a drive signal to a driver in response thereto, wherein the driver supplies a drive current to the actuator in accordance with the drive signal input thereto and wherein the actuator moves the optical device in the vertical direction of the optical disk plane in accordance with the drive current input thereto, said method comprising:

a first process for detecting that the level of the focus error signal is larger than a threshold level equal to a positive constant value, said first process being complete upon detecting that the level of the focus error signal is larger than the threshold level;

a second process for detecting, upon completion of the first process, that the level of the focus error signal has reached a maximum positive value, said second process being complete upon detecting that the level of the focus error signal has reached the maximum positive value;

a third process for detecting, upon completion of the second process, level variations per unit time of the focus error signal, and for providing a drive signal to the driver only when a decrease in the level of the focus error signal has been detected, the drive signal causing the actuator to move the optical device in a direction towards a peak value of the focus error signal, wherein said detecting and providing of the third process are repeated prior to completion of the third process, and a fourth process for driving, upon completion of the third process, the optical device with the actuator so that the value of the focus error signal becomes equal to zero upon inputting the drive signal to the driver.

2. A focus draw-in method for use in an optical disk device as defined in claim 1, wherein the method proceeds from the second process to the third process at such time that the value of the focus error signal is smaller than a value equal to the maximum positive value of the focus error signal minus a predetermined value, and the second process continues at such time that the value of the focus error signal is equal to or greater than the value equal to the maximum positive value of the focus error signal minus the predetermined value.

3. A focus draw-in method for use in an optical disk device as defined in claim 1, wherein, during the third process, the drive signal outputted to the driver from the control device is maintained at a maximum value.

4. A focus draw-in method for use in an optical disc device which includes an optical disk of an information recording medium, a laser for projecting light on the optical disc, an optical device for generating a focus error signal using light reflected from the disk and adapted to be moved by an actuator in a direction vertical to the optical disk plane, and a control device for receiving the focus error signal and for outputting a drive signal to a driver in response thereto, wherein the driver supplies a drive current to the actuator in accordance with the drive signal input thereto and wherein the actuator moves the optical device in the vertical direction of the optical disk plane in accordance with the drive current input thereto, said method comprising:

a first process for detecting that an absolute value of the focus error signal is less than a positive threshold value for more than a predetermined time period, said first process being complete upon detecting that the absolute value of the focus error signal is less than the positive threshold value for more than the predetermined time period;

a second process for detecting, upon completion of said first process, that the focus error signal is larger than a threshold level equal to a positive constant value, said second process being complete upon detecting that the focus error signal is larger then the threshold level;

a third process for detecting, upon completion of said second process, that the focus error signal has reached a maximum positive value, said third process being complete upon detecting that the focus error signal has reached the maximum positive value;

a fourth process for detecting, upon completion of said third process, level variations per unit time of the focus error signal, and for providing a drive signal to the driver only when a decrease in the level of the focus error signal has been detected, the drive signal causing the actuator to move the optical device in a direction towards a peak value of the focus error signal, and a fifth process for driving, upon completion of the fourth process, the optical device with the actuator so that the value of the focus error signal becomes equal to zero upon inputting the drive signal to the driver.

5. A focus draw-in method for use in an optical disc device which includes an optical disk of an information recording medium, a laser for projecting light on the optical disc, an optical device for generating a focus error signal by using light reflected from the disk and adapted to be moved by an actuator in a direction vertical to the optical disk plane, and a control device for receiving the focus error signal and for outputting a drive signal to a driver in response thereto, wherein the driver supplies a drive current to the actuator in accordance with the drive signal input thereto and wherein the actuator moves the optical device in the vertical direction of the optical disk plane in accordance with the drive current input thereto, said method comprising:

a first process for detecting that the focus error signal is larger than a threshold level equal to a positive constant value, said first process being complete upon detecting that the level of the focus error signal is larger than the threshold level;

a second process for detecting, upon completion of the first process, that the level of the focus error has reached a maximum positive value, said second process being complete upon detecting that the level of the focus error signal has reached the maximum positive value;

a third process for detecting, upon completion of the second process, level variations per unit time of the focus error signal, and for providing a drive signal to the driver only when a decrease in the level of the focus error signal has been detected, the drive signal causing the actuator to move the optical device in a direction towards a peak value of the focus error signal;

a fourth process for driving, upon completion of the third process, the optical device with the actuator in a direction opposite to the direction towards the maximum value of the focus error signal, and a fifth process for driving, upon completion of the fourth process, the optical device with the actuator so that the value of the focus error signal becomes equal to zero upon inputting the drive signal to the driver.

6. A focus draw-in method for use in an optical disc device adapted for reading and/or recording data on an optical disk of an information recording medium, said optical disk device having an optical device for emitting a light onto said optical disk, a driver for driving said optical device to change a focusing condition of the emitted light on said optical disk, and said optical device generating a focus error signal indicative of focusing condition of the emitted light on said optical disk, said method comprising:

(a) supplying a first power to said optical device from said driver to drive said optical device in a first direction;

(b) detecting, while said optical device is driven in the first direction, a peak of said focus error signal indicative of a maximum defocused condition;

(c) ceasing the supply of the first power in response to detection of the peak of the focus error signal and then supplying a second power to said optical device from said driver so as to apply a force to said optical device in a second direction opposite to said first direction to provide a braking effect to said optical device;

(d) detecting, while said optical device is applied with a force in the second direction, a changing point of said focus error signal indicative of a temporarily stopped condition of said optical device;

(e) ceasing the supply of the second power in response to detection of the changing point and then applying a servo control to said optical device to gradually bring said optical device into an in-focus condition.

7. A focus draw-in method as claimed in claim 6, wherein an absolute value of the first power supplied to said optical device to drive the optical device in the first direction increases linearly over time.

8. A focus draw-in method as claimed in claim 6, wherein the peak of the focus error signal is detected by periodically sampling the focus error signal and periodically determining a difference between a current sample of the focus error signal and a previous sample of the focus error signal, wherein the peak of the focus error signal is detected when either said difference becomes zero or a sign of said difference changes.

9. A focus draw-in method as claimed in claim 7, wherein the peak of the focus error signal is detected by periodically sampling the focus error signal and periodically determining a difference between a current sample of the focus error signal and a previous sample of the focus error signal, wherein the peak of the focus error signal is detected when either said difference becomes zero or a sign of said difference changes.

10. A focus draw-in method as claimed in claim 6, wherein said focus error signal gradually increases as the first power is supplied until said focus error signal reaches said peak, and wherein said peak of the focus error signal is a positive peak.

11. A focus draw-in method as claimed in claim 7, wherein said focus error signal gradually increases as the first power is supplied until said focus error signal reaches said peak, and wherein said peak of the focus error signal is a positive peak.

12. A focus draw-in method as claimed in claim 8, wherein said focus error signal gradually increases as the first power is supplied until said focus error signal reaches said peak, and wherein said peak of the focus error signal is a positive peak.

13. A focus draw-in method as claimed in claim 9, wherein said focus error signal gradually increases as the first power is supplied until said focus error signal reaches said peak, and wherein said peak of the focus error signal is a positive peak.

14. A focus draw-in method as claimed in claim 6, wherein said focus error signal gradually decreases as the first power is supplied until said focus error signal reaches said peak, and wherein said peak of the focus error signal is a negative peak.

15. A focus draw-in method as claimed in claim 7, wherein said focus error signal gradually decreases as the first power is supplied until said focus error signal reaches said peak, and wherein said peak of the focus error signal is a negative peak.

16. A focus draw-in method as claimed in claim 8, wherein said focus error signal gradually decreases as the first power is supplied until said focus error signal reaches said peak, and wherein said peak of the focus error signal is a negative peak.

17. A focus draw-in method as claimed in claim 9, wherein said focus error signal gradually decreases as the first power is supplied until said focus error signal reaches said peak, and wherein said peak of the focus error signal is a negative peak.

* * * * *

UNITED STATES PATENT AND TRADEMARK OFFICE
CERTIFICATE OF CORRECTION

PATENT NO. : 5,414,682
DATED : May 9, 1995
INVENTOR(S) : Makoto IIDA

It is certified that error appears in the above-indentified patent and that said Letters Patent is hereby corrected as shown below:

On the cover page, item [63], change "935,045" to --939,045--.

Signed and Sealed this

Third Day of October, 1995

Attest:

BRUCE LEHMAN

*Attesting Officer*     *Commissioner of Patents and Trademarks*